Patented June 13, 1933                                                    1,914,047

UNITED STATES PATENT OFFICE

ROBERT L. SIBLEY, OF NITRO, WEST VIRGINIA, ASSIGNOR TO THE RUBBER SERVICE LABORATORIES CO., OF AKRON, OHIO, A CORPORATION OF OHIO

VULCANIZATION OF RUBBER

No Drawing.        Application filed May 28, 1930. Serial No. 456,808.

The present invention is directed to the art of manufacturing vulcanized rubber of high quality, and possessing desirable commercial characteristics, by a process wherein a new type of accelerator is employed in the vulcanization step. The manufacture and means of employing the preferred new class of accelerators are fully set forth hereinafter and will be readily understood by the following description and examples of preferred modes of carrying out the invention.

Certain mercapto compounds such as mercapto-benzothiazole have been described as of value in accelerating the vulcanization of a rubber mix. Moreover, mercapto compounds such as mercapto-benzothiazole have been reacted with organic compounds such as guanidines to form products possessing vulcanization accelerating characteristics.

It has now been found that products obtained by the action of an aldehyde upon the products formed by the combination of an aromatic amine with a mercapto-aryl thiazole, for example, mercapto-benzothiazole may be readily prepared and comprise a class of new materials having a particularly desirable and characteristic accelerating action upon the rubber vulcanization process.

The following is one example of a preferred method of manufacturing one of my new type of accelerating compounds.

Substantially two molecular proportions of mercapto-benzothiazole and substantially one molecular proportion of 2,4 diamino diphenyl amine were combined preferably by heating the two reacting components together for a period of time at a temperature above the melting point of the mixture. The product thus formed, on cooling formed a solid which after grinding to a powder was treated with substantially one molecular proportion of acetaldehyde. If convenient or desirable, after the reaction is completed, the reaction mixture may be heated sufficiently to remove the water formed in the condensation step. The residual product is a brittle resin, which may be readily ground to a powder. Other proportions of acetaldehyde have been employed in place of the quantity specified in the example. Thus, one half and one and one half molar portions of acetaldehyde have been combined with the reaction product of equal mols of mercapto-benzothiazole and 2,4 diamino diphenyl amine. Both of these products were also found to comprise active vulcanization accelerators.

A portion of the material prepared as described in detail above was incorporated in the usual manner in a rubber stock comprising

|                                          | Parts |
|------------------------------------------|-------|
| Pale crepe rubber                        | 100   |
| Zinc oxide                               | 5     |
| Stearic acid                             | 2     |
| Sulfur                                   | 3     |
| The acetaldehyde derivative of the reaction product of mercapto-benzothiazole and 2,4 diamino diphenyl amine | 0.25 |
| Diphenyl guanidine                       | 0.25  |
| Anhydro formaldehyde aniline             | 0.50  |

The rubber stock thus compounded was then cured by heating in a press for different periods of time at the temperature given by 20 pounds of steam pressure per square inch. The vulcanized rubber product on testing was found to possess the following tensile characteristics.

Table I

| Cure | | Modulus of elasticity in lbs./in.² at elongations of | | | Tensile at break in lbs./in.² | Ultimate elongation |
|------|------|------|------|------|------|------|
| Time mins. | Lbs. steam pressure | 300% | 500% | 700% | | |
| 15 | 20 | 143 | 285 | 1075 | 2690 | 885 |
| 30 | 20 | 228 | 587 | 2615 | 3755 | 790 |
| 60 | 20 | 345 | 1120 | 4265 | 4690 | 740 |
| 90 | 20 | 398 | 1350 | -------- | 4675 | 695 |

It is thus shown that the preferred class of materials constitute an important group of accelerating compounds. The rubber stock in which the acetaldehyde derivative of the reaction product of mercapto-benzothiazole and 2,4 diamino diphenyl amine was incorporated as a vulcanization ingredient reached its optimum cure in 60 minutes at the low steam pressure of 20 pounds per square inch. In all the tests as set forth in the present specification, the preferred accelerator is employed in conjunction with basic accelerating materials and preferably with diphenyl guanidine and anhydro formaldehyde aniline. These materials or like basic materials are desirable to have present in the stock in order that the rapid accelerating action of the new products described may be controlled and the rubber stocks readily handled under ordinary conditions. However, it is well known to those skilled in the art of rubber compounding that both diphenyl guanidine and anhydro formaldehyde aniline when employed in a rubber stock of the composition set forth show substantially no acceleration when the rubber stock is vulcanized for the periods of time and temperatures indicated in the example. The cures set forth in the examples are then those produced by the new class of accelerators described activated by a basic accelerator.

Another example of the preferred class of accelerating compounds comprises the heptaldehyde derivative of the reaction product of substantially two molecular proportions of mercapto-benzothiazole and substantially one molecular proportion of 2,4 diamino diphenyl amine, prepared in a manner analogous to that given for the acetaldehyde derivative described hereinbefore. The material formed was a resin.

This material was incorporated in a rubber stock comprising

| | Parts |
|---|---|
| Pale crepe | 100 |
| Zinc oxide | 5 |
| Stearic acid | 2 |
| Sulfur | 3 |
| The heptaldehyde derivative of the reaction product of mercapto-benzothiazole and 2,4 diamino diphenyl amine | 0.25 |
| Diphenyl guanidine | 0.25 |
| Anhydro formaldehyde aniline | 0.50 | and the stock was vulcanized in the usual manner.

The tensile characteristics of the cured rubber product are set forth in Table II.

Table II

| Cure | | Modulus of elasticity in lbs./in.$^2$ at elongations of | | | Tensile at break in lbs./in.$^2$ | Ultimate elongation |
|---|---|---|---|---|---|---|
| Time mins. | Lbs. steam pressure | 300% | 500% | 700% | | |
| 15 | 20 | 130 | 232 | 865 | 2385 | 910 |
| 30 | 20 | 221 | 505 | 2130 | 3380 | 790 |
| 60 | 20 | 326 | 995 | 4160 | 4405 | 725 |
| 90 | 20 | 362 | 1233 | 4590 | 4705 | 710 |

The results set forth clearly show the great activity of the accelerator employed in that a cured product of high quality is obtainable at lower temperatures than those ordinarily employed.

A further example of the new class of accelerators comprises the product formed by treating the reaction product of substantially two molecular proportions of mercapto-benzothiazole and substantially one molecular proportion of 2,4 diamino diphenyl amine with substantially one molecular proportion of crotonaldehyde, in a manner analogous to the preparation of the acetaldehyde derivative previously described. This material is a brittle resin and upon incorporating in a rubber stock and curing and testing in the ordinary manner, the vulcanized rubber product was found to possess very desirable properties as a vulcanization accelerator. Thus a rubber stock was compounded in the usual manner comprising

| | Parts |
|---|---|
| Pale crepe rubber | 100 |
| Zinc oxide | 5 |
| Stearic acid | 2 |
| Sulfur | 3 |
| The crotonaldehyde derivative of the reaction product of 2,4 diamino diphenyl amine and mercapto-benzothiazole | 0.25 |
| Diphenyl guanidine | 0.25 |
| Anhydro formaldehyde aniline | 0.50 |

The compounded rubber stock was vulcanized by heating in a press in the usual manner and on testing was found to possess the following physical characteristics.

Table III

| Cure | | Modulus of elasticity in lbs./in.$^2$ at elongations of | | | Tensile at break in lbs./in.$^2$ | Ultimate elongation |
|---|---|---|---|---|---|---|
| Time mins. | Lbs. steam pressure | 300% | 500% | 700% | | |
| 15 | 20 | 128 | 249 | 858 | 2385 | 910 |
| 30 | 20 | 172 | 448 | 2060 | 3455 | 820 |
| 60 | 20 | 316 | 940 | 3820 | 4540 | 740 |
| 90 | 20 | 372 | 1203 | 4550 | 4625 | 705 |

As another example of the preferred class of accelerators, the butylaldehyde derivative of the reaction product of mercapto-benzothiazole and 2,4 diamino diphenyl amine was prepared in a manner similar to that hereinbefore described. This product was likewise incorporated in the usual manner in a rubber stock comprising

| | Parts |
|---|---|
| Pale crepe rubber | 100 |
| Zinc oxide | 5 |
| Stearic acid | 2 |
| Sulfur | 3 |
| The butylaldehyde derivative of the reaction product of mercapto-benzothiazole and 2,4 diamino diphenyl amine | 0.25 |
| Diphenyl guanidine | 0.25 |
| Anhydro formaldehyde aniline | 0.50 |

After vulcanizing the compounded rubber stock, the curved rubber product was found to possess the tensile and modulus characteristics set forth in Table IV.

Table IV

| Cure | | Modulus of elasticity in lbs./in.² at elongations of | | | Tensile at break in lbs./in.² | Ultimate elongation |
|---|---|---|---|---|---|---|
| Time mins. | Lbs. steam pressure | 300% | 500% | 700% | | |
| 15 | 20 | 139 | 273 | 1013 | 2418 | 880 |
| 30 | 20 | 227 | 548 | 2315 | 3730 | 800 |
| 60 | 20 | 334 | 1030 | 4140 | 4645 | 730 |
| 90 | 20 | 386 | 1275 | 4715 | 4820 | 710 |

From the data set forth in the preceding examples, it is apparent that the aldehyde derivatives of the reaction product of an aromatic amine and a mercapto-benzothiazole constitute a very desirable class of rubber vulcanization accelerators.

Other aromatic amines than 2,4 diamino diphenyl amine have been reacted with a mercapto-benzothiazole and the product thus formed further reacted with an aldehyde to form further examples of the new class of rubber vulcanization accelerators.

The following is one method of manufacturing another example of the preferred class of accelerators.

Substantially equi-molecular proportions of mercapto-benzothiazole and p,p diamino diphenyl methane were reacted preferably by heating the two reacting components together at a temperature slightly above the melting point of the mass. After the reaction was completed and the product formed allowed to cool, the resulting material solidified. This material was then treated in a convenient manner with substantially an equi-molecular proportion of acetaldehyde and after heating sufficiently to remove any water formed by the reaction, a soft resin was produced. A larger proportion of aldehyde produced a hard resin. A portion of this material formed as described was incorporated on the mixing rolls in the usual manner in a rubber stock comprising

| | Parts |
|---|---|
| Pale crepe rubber | 100 |
| Zinc oxide | 5 |
| Stearic acid | 2 |
| Sulfur | 3 |
| The acetaldehyde derivative of the reaction product of mercapto-benzothiazole and p,p diamino diphenyl methane | 0.35 |
| Diphenyl guanidine | 0.25 |
| Anhydro formaldehyde aniline | 0.40 |

The compounded stock thus formed was cured by heating in a press, and, on testing the vulcanized product was found to possess the following tensile and modulus properties.

Table V

| Cure | | Modulus of elasticity in lbs./in.² at elongations of | | | Tensile at break in lbs./in.² | Ultimate elongation |
|---|---|---|---|---|---|---|
| Time mins. | Lbs. steam pressure | 300% | 500% | 700% | | |
| 15 | 20 | 130 | 234 | 853 | 2350 | 910 |
| 30 | 20 | 199 | 477 | 2135 | 3400 | 790 |
| 60 | 20 | 318 | 1005 | 4170 | 4590 | 740 |
| 90 | 20 | 378 | 1288 | 4640 | 4640 | 700 |
| 120 | 20 | 412 | 1400 | | 4670 | 680 |

The reaction product of other than equi-molecular proportions of aldehyde with the product formed by reacting a mercapto-benzothiazole and an aryl amine have been prepared and found to be excellent accelerators of the vulcanization process.

Thus, for example p,p diamino diphenyl methane was reacted with mercapto-benzothiazole in substantially equi-molecular proportions and the resulting material reacted with substantially 1.5 molecular proportions of an aldehyde for example acetaldehyde, preferably by passing said aldehyde thereinto at a temperature of substantially 100 to 120° C. until saturation was reached. After the reaction was completed the product formed on cooling was a resin which ground to a powder.

A portion of this material was compounded in a rubber stock in the usual manner comprising

| | Parts |
|---|---|
| Pale crepe rubber | 100 |
| Zinc oxide | 5 |
| Stearic acid | 2 |
| Sulfur | 3 |
| The reaction product of 1.5 molecular proportions of acetaldehyde and one molecular proportion of the reaction product of p,p diamino diphenyl methane and mercapto-benzothiazole | 0.35 |
| Diphenyl guanidine | 0.25 |
| Anhydro formaldehyde aniline | 0.40 |

The results obtained on vulcanizing the compounded stock follow in Table VI.

Table VI

| Cure | | Modulus of elasticity in lbs./in.² at elongations of | | | Tensile at break in lbs./in.² | Ultimate elongation |
|---|---|---|---|---|---|---|
| Time mins. | Lbs. steam pressure | 300% | 500% | 700% | | |
| 15 | 20 | 83 | 154 | 540 | 1680 | 920 |
| 30 | 20 | 203 | 590 | 2315 | 3300 | 785 |
| 60 | 20 | 344 | 1253 | | 4320 | 695 |
| 90 | 20 | 420 | 1375 | 4320 | 4330 | 700 |
| 120 | 20 | 434 | 1530 | | 4360 | 695 |

From the data set forth in Table VI it is seen that the preferred class of accelerators possess an additional advantage in that rubber stocks in which they are incorporated do not over cure readily. That is the rubber product in which they are milled or incorporated by any desirable means does not lose to an appreciable extent its tensile and modulus characteristics on continued heating in the press after optimum cure has been attained. Moreover, the stocks while curing rapidly do not set cure or scorch during milling or other handling operations.

As another example of operating the present invention, the crotonaldehyde derivative of the reaction product of substantially equimolecular proportions of mercapto-benzothiazole and p,p diamino diphenyl methane was prepared preferably by reacting said compounds in the ratio of substantially equimolecular proportions thereof. After the elimination of any water formed by the reaction, the resulting product was a brittle resin.

A portion of this material was compounded in the usual manner in a rubber mix comprising

| | Parts |
|---|---|
| Pale crepe rubber | 100 |
| Zinc oxide | 5 |
| Stearic acid | 2 |
| Sulfur | 3 |
| The crotonaldehyde derivative of the reaction product of substantially equi-molecular proportions of mercapto-benzothiazole and p,p diamino diphenyl methane | 0.35 |
| Diphenyl guanidine | 0.25 |
| Anhydro formaldehyde aniline | 0.4 |

After curing the compounded rubber stock, the following test data were obtained.

Table VII

| Cure | | Modulus of elasticity in lbs./in.² at elongations of | | | Tensile at break in lbs./in.² | Ultimate elongation |
|---|---|---|---|---|---|---|
| Time mins. | Lbs. steam pressure | 300% | 500% | 700% | | |
| 15 | 20 | 123 | 249 | 777 | 2130 | 900 |
| 30 | 20 | 204 | 510 | 2110 | 3560 | 810 |
| 60 | 20 | 324 | 990 | 4050 | 4350 | 725 |
| 90 | 20 | 341 | 1170 | 4240 | 4460 | 710 |

From the data hereinbefore set forth it is conclusively shown that the new class of materials comprise a group of vulcanization accelerators that are particularly desirable in that they promote complete cure in a short time at 20 pounds of steam pressure per square inch.

Other aromatic amines, and particularly aromatic diamines, than those hereinbefore disclosed may be reacted with a mercapto-benzothiazole and this product further reacted with aldehydes in a manner analogous to that disclosed, and employed as accelerators. Thus meta phenylene diamine, meta toluene diamine, and the like may be reacted with a mercapto-benzothiazole and further reacted with acetaldehyde, butylaldehyde, propyl aldehyde, crotonaldehyde, acrolein and analogous aldehydes and employed as vulcanization accelerators.

The present invention is limited only as defined in the following claims, in which it is intended to claim all novelty inherent in the invention as broadly as is permissible in view of the prior art.

What is claimed is:

1. The process of vulcanizing rubber which comprises heating rubber and sulfur in the presence of an accelerator comprising an aldehyde derivative of a reaction product of an aromatic primary diamine and a mercapto-benzothiazole.

2. The process of vulcanizing rubber which comprises heating rubber and sulfur in the presence of an accelerator comprising an aliphatic aldehyde derivative of a reaction product of an aromatic primary diamine and a mercapto-benzothiazole.

3. The process of vulcanizing rubber which comprises heating rubber and sulfur in the presence of an accelerator comprising an aldehyde derivative of a reaction product of an aromatic diamine and a mercapto-benzothiazole.

4. The process of vulcanizing rubber which comprises heating rubber and sulfur in the presence of an accelerator comprising an aliphatic aldehyde derivative of a reaction product of a phenyl diamine and a mercapto-benzothiazole.

5. The process of vulcanizing rubber which comprises heating rubber and sulfur in the presence of an accelerator comprising an aliphatic aldehyde derivative, said aldehyde containing less than eight carbon atoms, of a reaction product of a phenyl diamine and a mercapto-benzothiazole.

6. The process of vulcanizing rubber which comprises heating rubber and sulfur in the presence of an accelerator comprising an aliphatic aldehyde derivative, said aldehyde containing less than eight carbon atoms, of a reaction product of a phenyl diamine and 2-mercapto-benzothiazole.

7. The process of vulcanizing rubber which comprises heating rubber and sulfur in the presence of an accelerator comprising an aliphatic aldehyde derivative, said aldehyde containing less than eight carbon atoms, of a reaction product of 2,4 diamino diphenyl amine and mercapto-benzothiazole.

8. The process of vulcanizing rubber which comprises heating rubber and sulfur in the presence of an accelerator comprising an acetaldehyde derivative of a reaction product of 2,4 diamino diphenyl amine and mercapto-benzothiazole.

9. The process of vulcanizing rubber which comprises heating rubber and sulfur in the presence of an accelerator comprising a product prepared by reacting substantially equi-molecular proportions of acetaldehyde and the reaction product of substantially one molecular proportion of 2,4 diamino diphenyl amine and substantially two molecular proportions of mercapto-benzothiazole.

10. The vulcanized rubber produced by heating rubber and sulfur in the presence of an accelerator comprising an aldehyde derivative of a reaction product of an aromatic primary diamine and a mercapto-benzothiazole.

11. The vulcanized rubber produced by heating rubber and sulfur in the presence of an accelerator comprising an aliphatic aldehyde derivative of a reaction product of an aromatic primary diamine and a mercapto-benzothiazole.

12. The vulcanized rubber produced by heating rubber and sulfur in the presence of an accelerator comprising an aldehyde derivative of a reaction product of an aromatic diamine and a mercapto-benzothiazole.

13. The vulcanized rubber produced by heating rubber and sulfur in the presence of an accelerator comprising an aliphatic aldehyde derivative of a reaction product of a phenyl diamine and a mercapto-benzothiazole.

14. The vulcanized rubber produced by heating rubber and sulfur in the presence of an accelerator comprising an aliphatic aldehyde derivative, said aldehyde containing less than eight carbon atoms, of a reaction product of a phenyl diamine and a mercapto-benzothiazole.

15. The vulcanized rubber produced by heating rubber and sulfur in the presence of an accelerator comprising an aliphatic aldehyde derivative, said aldehyde containing less than eight carbon atoms, of a reaction product of a phenyl diamine and mercapto-benzothiazole.

16. The vulcanized rubber produced by heating rubber and sulfur in the presence of an accelerator comprising an aliphatic aldehyde derivative, said aldehyde containing less than eight carbon atoms, of a reaction product of 2,4 diamino diphenyl amine and mercapto-benzothiazole.

17. The vulcanized rubber produced by heating rubber and sulfur in the presence of an accelerator comprising an acetaldehyde derivative of a reaction product of 2,4 diamino diphenyl amine and mecapto-benzothiazole.

18. The vulcanized rubber produced by heating rubber and sulfur in the presence of an accelerator comprising a product prepared by reacting substantially equi-molecular proportions of acetaldehyde and the reaction product of substantially one molecular proportion of 2,4 diamino diphenyl amine and substantially two molecular proportions of mercapto-benzothiazole.

19. The process of vulcanizing rubber which comprises heating rubber and sulfur in the presence of an accelerator comprising an aliphatic aldehyde derivative of a reaction product of 2 mercapto-benzothiazole and a diamino diphenyl substituted compound.

20. The vulcanized rubber produced by heating rubber and sulfur in the presence of an accelerator comprising an aliphatic aldehyde derivative of a reaction product of 2 mercapto-benzothiazole and a diamino diphenyl substituted compound.

21. The process of vulcanizing rubber which comprises heating rubber and sulfur in the presence of an accelerator comprising an aliphatic aldehyde derivative of a reaction product of p,p diamino diphenyl methane and a mercapto-benzothiazole.

22. The vulcanized rubber produced by heating rubber and sulfur in the presence of an accelerator comprising an aliphatic aldehyde derivative of a reaction product of p,p diamino diphenyl methane and a mercapto-benzothiazole.

23. The process of vulcanizing rubber which comprises heating rubber and sulfur in the presence of an accelerator comprising a product prepared by reacting substantially one and one-half molecular proportions of acetaldehyde and substantially one molecular proportion of the reaction product of substantially equi-molecular proportions of p,p diamino diphenyl methane and mercapto-benzothiazole.

24. The vulcanized rubber product produced by heating rubber and sulfur in the presence of an accelerator comprising a product prepared by reacting substantially one and one-half molecular proportions of acetaldehyde and substantially one molecular proportion of the reaction product of substantially equi-molecular proportions of p,p diamino diphenyl methane and mercapto-benzothiazole.

In testimony whereof I hereunto affix my signature.

ROBERT L. SIBLEY.